(12) United States Patent
Kimura et al.

(10) Patent No.: US 11,555,580 B2
(45) Date of Patent: Jan. 17, 2023

(54) AIR BLEEDER AND METHOD FOR BLEEDING AIR

(71) Applicant: Yamazaki Mazak Corporation, Niwa-gun (JP)

(72) Inventors: Jyojiro Kimura, Niwa-gun (JP); Masahiro Kaneko, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 1099 days.

(21) Appl. No.: 16/191,439

(22) Filed: Nov. 15, 2018

(65) Prior Publication Data
US 2019/0195426 A1 Jun. 27, 2019

Related U.S. Application Data

(63) Continuation of application No. PCT/JP2017/046863, filed on Dec. 27, 2017.

(51) Int. Cl.
*F16N 39/00* (2006.01)
*F16N 7/00* (2006.01)
(Continued)

(52) U.S. Cl.
CPC ....... *F16N 39/002* (2013.01); *B01D 19/0005* (2013.01); *B01D 19/0031* (2013.01);
(Continued)

(58) Field of Classification Search
CPC ....... B23Q 11/122; F16N 39/002; F16N 7/00; F16N 39/06; B01D 19/0031; B01D 19/0042; B01D 19/0063
See application file for complete search history.

(56) References Cited

U.S. PATENT DOCUMENTS 3,618,709 A 11/1971 Boelkins
3,670,850 A * 6/1972 Swearingen .......... F16N 39/002
277/432
(Continued)

FOREIGN PATENT DOCUMENTS

CA 2112181 6/1994
DE 4344788 7/1994
(Continued)

OTHER PUBLICATIONS

International Search Report for corresponding International Application No. PCT/JP2017/046863, dated Feb. 20, 2018.
(Continued)

*Primary Examiner* — Michael R Mansen
*Assistant Examiner* — Mark K Buse
(74) *Attorney, Agent, or Firm* — Mori & Ward, LLP (57) ABSTRACT

An air bleeder includes a branch, a lubricant supply conduit, and a return conduit. Lubricant stored in a tank is to be supplied to a valve provided in a machine tool via the lubricant supply conduit. The lubricant supply conduit includes a first supply conduit, and a second supply conduit. The first supply conduit connects the branch and the tank. The second supply conduit connects the branch at a first connecting position and the valve. The return conduit connects the tank and the branch at a second connecting position higher than the first connecting position in a height direction along a height of the air bleeder to return lubricant to the tank and to remove air from lubricant in the lubricant supply conduit.

16 Claims, 5 Drawing Sheets

(51) Int. Cl.
  *B23Q 11/12* (2006.01)
  *F16N 39/06* (2006.01)
  *B01D 19/00* (2006.01)
  *B01F 23/20* (2022.01)
  *B01F 25/00* (2022.01)
  *B01F 101/39* (2022.01)

(52) U.S. Cl.
  CPC ..... *B01D 19/0042* (2013.01); *B01D 19/0063* (2013.01); *B01F 23/29* (2022.01); *B01F 25/1051* (2022.01); *B23Q 11/122* (2013.01); *F16N 7/00* (2013.01); *F16N 39/06* (2013.01); *B01F 2101/39* (2022.01)

(56) References Cited

U.S. PATENT DOCUMENTS

| | | | | |
|---|---|---|---|---|
| 4,039,305 | A * | 8/1977 | Livesay | B01D 19/0031 96/219 |
| 5,415,249 | A | 5/1995 | Grattan et al. | |
| 5,584,650 | A * | 12/1996 | Redmond | F16N 39/002 415/55.5 |
| 2002/0014150 | A1 * | 2/2002 | Shirakawa | F16N 39/002 92/61 |
| 2007/0119657 | A1 * | 5/2007 | Urata | F16N 39/002 184/6.23 |
| 2020/0086441 | A1 * | 3/2020 | Li | B05B 13/0431 |

FOREIGN PATENT DOCUMENTS

| | | |
|---|---|---|
| DE | 102010015715 | 10/2011 |
| JP | 03-186696 | 8/1991 |
| JP | 08-261393 | 10/1996 |
| JP | 09-324606 | 12/1997 |
| JP | 2001-304489 | 10/2001 |

OTHER PUBLICATIONS

Written Opinion for corresponding International Application No. PCT/JP2017/046863, dated Feb. 20, 2018.

The International Preliminary Report on Patentability (Chapter 1) with English translation of the Written Opinion for corresponding International Application No. PCT/JP2017/046863, dated Jun. 30, 2020.

English translation of the International Search Report for corresponding International Application No. PCT/JP2017/046863, dated Feb. 20, 2018.

Extended European Search Report for corresponding EP Application No. 17890840.6-1007, dated Jan. 24, 2019.

* cited by examiner

AIR BLEEDER AND METHOD FOR BLEEDING AIR

CROSS-REFERENCE TO RELATED APPLICATIONS

The present application is a continuation application of International Application No. PCT/JP2017/046863, filed Dec. 27, 2017. The contents of this application are incorporated herein by reference in their entirety.

BACKGROUND OF THE INVENTION

Field of the Invention

The present invention relates to an air bleeder and a method for bleeding air.

Discussion of the Background

A lubricator known in the art sends a fluid mixture of the lubricant and air to a lubrication target portion to reduce frictional resistance at the lubrication target portion. The lubricant and air are mixed in a mixing valve. The mixing valve receives lubricant through a lubricant supply conduit and receives air through an air supply conduit. The received the lubricant and air are mixed together in the mixing valve, and the resulting fluid mixture is sent form the mixing valve toward the lubrication target portion.

A related technique is disclosed in JP 2001-304489A, which recites a mixing valve that simplifies air bleeding work to significantly shorten the time necessary for the air bleeding work. The mixing valve recited in JP 2001-304489A includes: a valve that is openable and closable by an intermittent oil feeding operation of a pump; an opening pin configured to keep the valve in open state; and an air bleeding button with which the opening pin is operated. For the air bleeding work to be performed, the air bleeding button is pressed. When the air bleeding button is pressed, oil intermittently sent under pressure from the pump continuously passes through the mixing valve and is discharged out of the mixing valve together with air bubbles in the mixing valve.

SUMMARY OF THE INVENTION

According to a first aspect of the present invention, an air bleeder is configured to remove air out of a lubricant supply conduit. The air bleeder includes the lubricant supply, a lubricant tank, a branching portion, and a return conduit. Through the lubricant supply conduit, a lubricant is supplied to a mixing valve located in a machine tool. In the lubricant tank, the lubricant is stored. The branching portion is located along the lubricant supply conduit. The return conduit connects the branching portion and the lubricant tank to each other. The lubricant supply conduit includes a first supply conduit and a second supply conduit. The first supply conduit connects the lubricant tank and the branching portion to each other. The second supply conduit connects the branching portion and the mixing valve to each other. At the branching portion, an upper-stream end of the return conduit is located above an upper-stream end of the second supply conduit.

According to a second aspect of the present invention, a method for bleeding air uses an air bleeder configured to remove air out of a lubricant supply conduit. The air bleeder includes the lubricant supply, a lubricant tank, a branching portion, and a return conduit. Through the lubricant supply conduit, a lubricant is supplied to a mixing valve located in a machine tool. In the lubricant tank, the lubricant is stored. The branching portion is located along the lubricant supply conduit. The return conduit connects the branching portion and the lubricant tank to each other. The lubricant supply conduit includes a first supply conduit and a second supply conduit. The first supply conduit connects the lubricant tank and the branching portion to each other. The second supply conduit connects the branching portion and the mixing valve to each other. At the branching portion, an upper-stream end of the return conduit is located above an upper-stream end of the second supply conduit. The method includes opening the return conduit to form a circulation conduit including the lubricant tank, the first supply conduit, the branching portion, and the return conduit. The lubricant is caused to circulate through the circulation conduit with a flow of the lubricant in the second supply conduit stopped by the mixing valve.

According to a third aspect of the present invention, an air bleeder includes a branch, a lubricant supply conduit, and a return conduit. Lubricant stored in a tank is to be supplied to a valve provided in a machine tool via the lubricant supply conduit. The lubricant supply conduit includes a first supply conduit, and a second supply conduit. The first supply conduit connects the branch and the tank. The second supply conduit connects the branch at a first connecting position and the valve. The return conduit connects the tank and the branch at a second connecting position higher than the first connecting position in a height direction along a height of the air bleeder to return lubricant to the tank and to remove air from lubricant in the lubricant supply conduit.

According to a fourth aspect of the present invention, a method for bleeding air, includes supplying lubricant stored in a tank to a valve provided in a machine tool via a lubricant supply conduit. The lubricant supply conduit connects the tank and the valve and includes a first supply conduit and a second supply conduit. The first supply conduit connects a branch and the tank. The second supply conduit connects the valve and the branch at a first connecting position. The method includes opening a return conduit which connects the tank and the branch at a second connecting position higher than the first connecting position in a height direction along a height of an air bleeder. The method includes flowing lubricant in the lubricant supply conduit to return to the tank via the return conduit and to remove air from lubricant in the lubricant supply conduit in a state where supply of the lubricant to the valve via the second supply conduit is suppressed.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE EMBODIMENTS

Embodiments of the present invention will be described by referring to an air bleeder 1, a lubricator 100, which is provided with the air bleeder 1, and a method for bleeding air, with reference to the drawings. It is noted that in the following description of the embodiments, identical reference numerals are used to denote identical portions, members, or components having identical functions, and redundant description of identical portions, members, or components will be omitted.

First Embodiment

Figure 1:
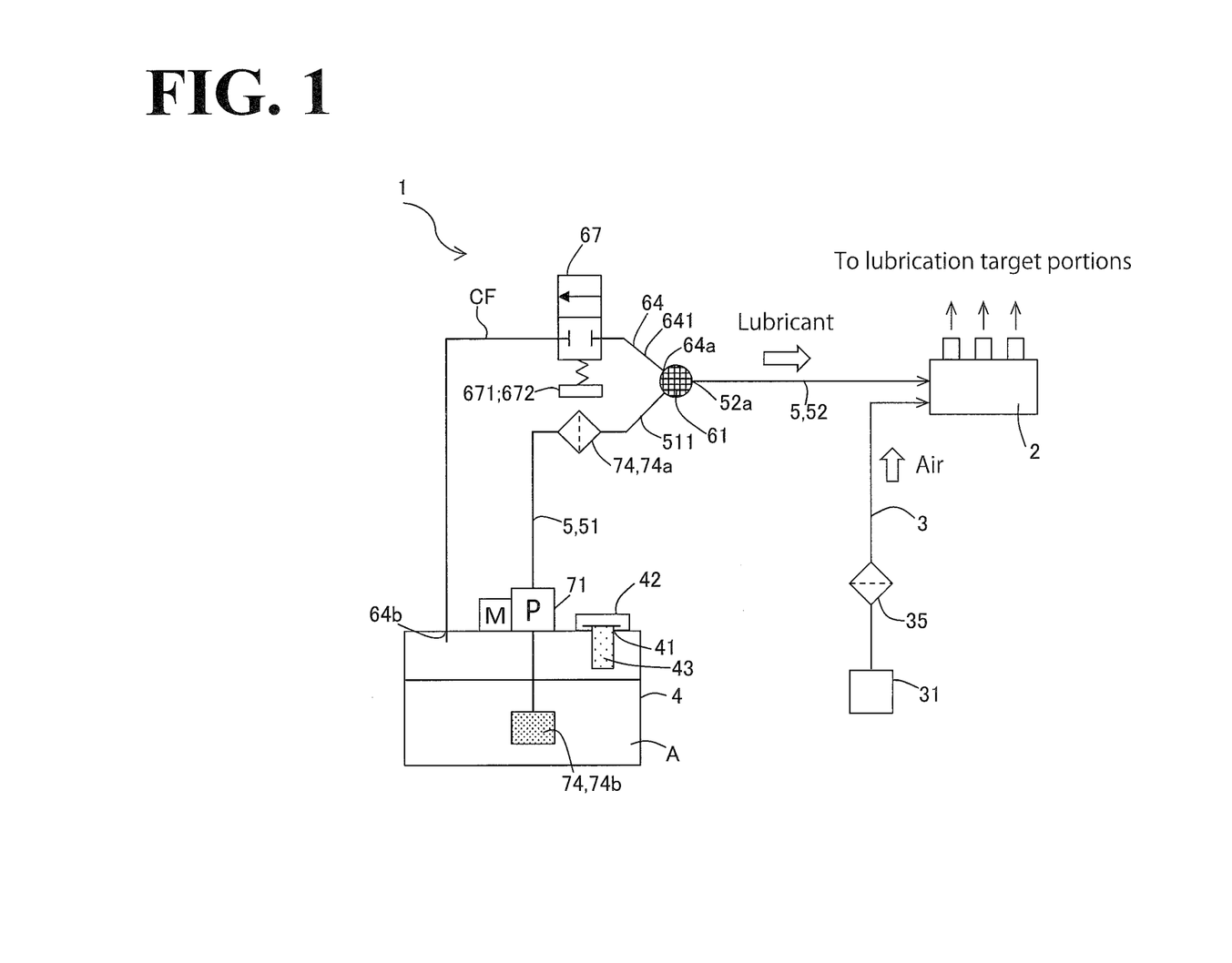
FIG. 1 schematically illustrates an air bleeder according to a first embodiment.
Figure 2:
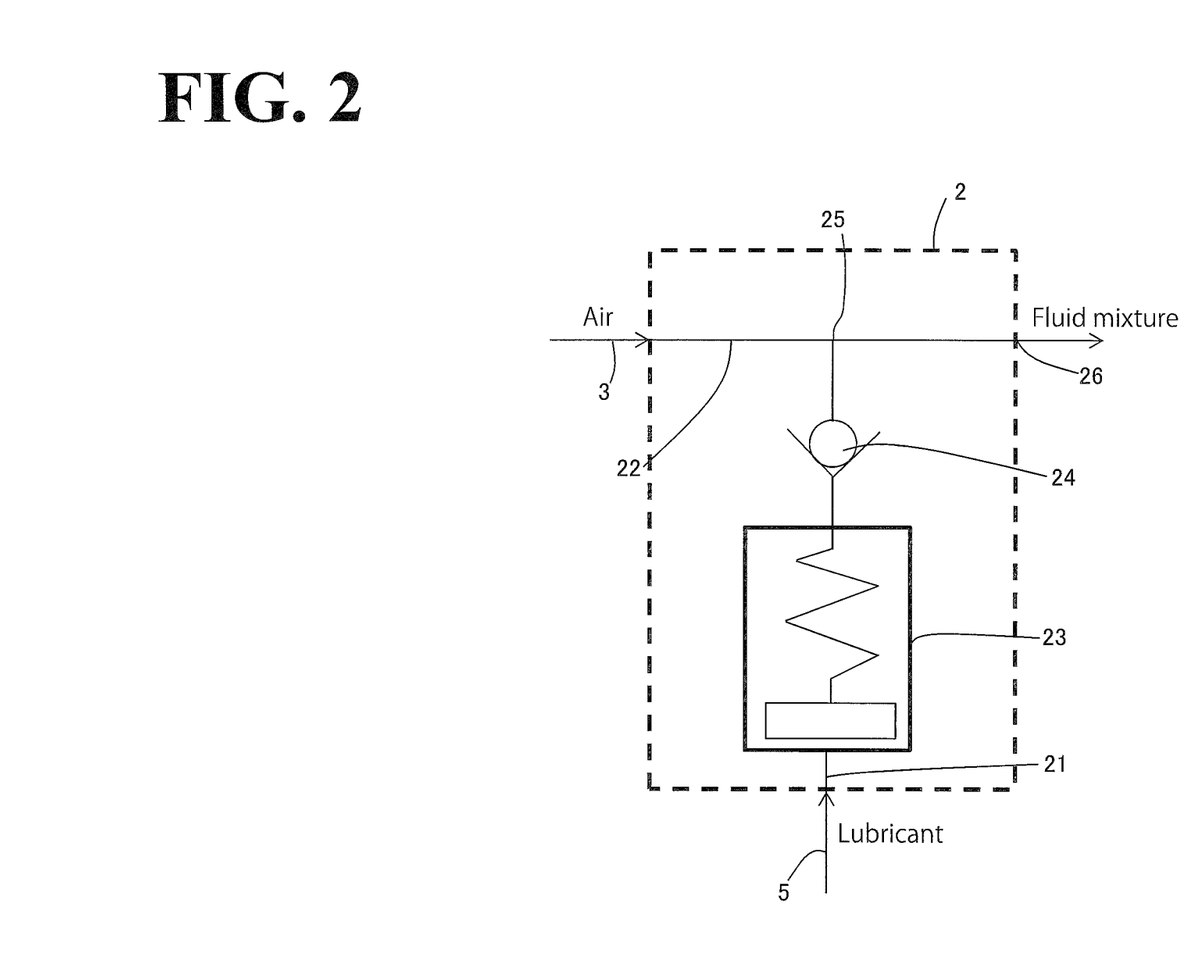
FIG. 2 schematically illustrates an exemplary internal structure of a mixing valve.

By referring to FIGS. 1 and 2, the air bleeder 1 according to the first embodiment will be described. FIG. 1 schematically illustrates the air bleeder 1 according to the first embodiment. FIG. 2 schematically illustrates an exemplary internal structure of a mixing valve 2.

The air bleeder 1 is an air bleeder that removes contaminate air out of a lubricant supply conduit 5, which supplies lubricant A to the mixing valve 2, which is located in a machine tool.

The air bleeder 1 includes a lubricant tank 4, the lubricant supply conduit 5, a branching portion (a branch) 61, and a return conduit 64. It is noted that as illustrated in FIG. 1, the air bleeder 1 may include a switch valve 67 and/or a lubricant supply pump 71.

The mixing valve 2 mixes the lubricant A and air together. As the mixing valve 2, a known mixing valve may be employed. In the example illustrated in FIG. 2, the mixing valve 2 includes: a lubricant conduit 21, which is connected to the lubricant supply conduit 5; an air conduit 22, which is connected to an air supply conduit 3; a metering valve 23; and a check valve 24.

The metering valve 23 of the mixing valve 2 is supplied the lubricant A through the lubricant supply conduit 5 and the lubricant conduit 21. Upon supply of the lubricant A, the metering valve 23 intermittently ejects a predetermined amount of the lubricant A. The metering valve 23 does not turn into open state unless the pressure of the lubricant conduit 21 exceeds a predetermined threshold. That is, the metering valve 23 is kept in closed state while the lubricant supply pump 71 is not operating.

The air conduit 22 is continuously supplied air from the air supply conduit 3. The air supplied from the air conduit 22 and the predetermined amount of the lubricant A intermittently supplied from the metering valve 23 are mixed (subjected to mixing) together at a mixture region 25. The air and the lubricant A are mixed together into a fluid mixture, which is discharged through a discharge orifice 26 of the mixing valve 2.

It is noted that since the check valve 24 is located between the metering valve 23 and the mixture region 25, the air or the fluid mixture is prevented from moving beyond the check valve 24 and flowing into the metering valve 23.

Referring to FIG. 1, the air supply conduit 3 is a conduit through which air is supplied to the mixing valve 2. The air supply conduit 3 connects an air supply source 31, such as a compressor, and the mixing valve 2 to each other. A filter 35, which removes foreign matter contaminating air, may be provided along the air supply conduit 3.

The lubricant tank 4 is where the lubricant A is stored. In the example illustrated in FIG. 1, the supply of the lubricant A from the lubricant tank 4 to the lubricant supply conduit 5 is implemented using the lubricant supply pump 71. In the example illustrated in FIG. 1, the lubricant supply pump 71 is located along the lubricant supply conduit 5 (more specifically, a first supply conduit 51, described later). The lubricant supply pump 71 is driven by a motor M. An example of the motor M is an electric motor.

The lubricant supply conduit 5 is a conduit through which the lubricant A is supplied to the mixing valve 2. The lubricant supply conduit 5 includes the first supply conduit 51 and a second supply conduit 52. The first supply conduit 51 is an upper-stream conduit that connects the lubricant tank 4 and the branching portion 61 to each other. The second supply conduit 52 is a lower-stream conduit that connects the branching portion 61 and the mixing valve 2 to each other. As used herein, the term "upper-stream" refers to the upstream side of the direction in which the lubricant A flows, and the term "lower-stream" refers to the downstream side of the direction in which the lubricant A flows. The first supply conduit 51 may be a single conduit (flexible conduit or rigid conduit) or may be a combination of a plurality of conduits (flexible conduits or rigid conduits) connected to each other. Similarly, the second supply conduit 52 may be a single conduit (flexible conduit or rigid conduit) or may be a combination of a plurality of conduits (flexible conduits or rigid conduits) connected to each other.

The branching portion 61 is a branching portion located along the lubricant supply conduit 5. The branching portion 61 causes the first supply conduit 51 to branch at least into the second supply conduit 52 and the return conduit 64. When the switch valve 67, described later, is in closed state (which keeps the return conduit 64 in closed state), the lubricant A supplied from the lubricant tank 4 is supplied to the mixing valve 2 through the first supply conduit 51 and the second supply conduit 52. When the switch valve 67, described later, is in open state (which keeps the return conduit 64 in open state), the lubricant A supplied from the lubricant tank 4 returns to the lubricant tank 4 through the first supply conduit 51 and the return conduit 64.

The return conduit 64 is a conduit that connects the branching portion 61 and the lubricant tank 4 to each other. The return conduit 64 may be a single conduit (flexible conduit or rigid conduit) or may be a combination of a plurality of conduits (flexible conduits or rigid conduits) connected to each other. In the example illustrated in FIG. 1, the lubricant tank 4, the first supply conduit 51, the branching portion 61, and the return conduit 64 form a circulation conduit CF.

The switch valve 67 is a valve that opens and closes the return conduit 64. In the example illustrated in FIG. 1, the switch valve 67 is an openable and closable valve located along the return conduit 64. When the openable and closable valve (the switch valve 67) is in closed state, the return conduit 64 is closed. When the openable and closable valve (the switch valve 67) is in open state, the return conduit 64 is open.

Alternatively, the switch valve 67 may be located at the branching portion 61. In this case, as the switch valve 67, a multi-directional valve such as a three-way valve may be employed. When the multi-directional valve (for example, three-way valve) makes a fluid connection between the first supply conduit 51 and the second supply conduit 52, the multi-directional valve (for example, three-way valve) closes the return conduit 64. When the multi-directional valve (for example, three-way valve) makes a fluid connection between the first supply conduit 51 and the return conduit 64, the multi-directional valve (for example, three-way valve) closes the second supply conduit 52.

It is noted that from the viewpoint of improving reliability in air bleeding, the switch valve 67 is preferably located along the return conduit 64, instead of at the branching portion 61. When the switch valve 67 is located along the return conduit 64, even if air is trapped in the switch valve 67 itself, there is no or minimal possibility of the trapped air flowing toward the mixing valve 2.

In the first embodiment, the switch valve 67 may be omitted. In this case, it is possible to open and close the return conduit 64 using a tool (such as a clip) separate from the air bleeder 1.

In the first embodiment, with the air bleeder 1 installed in an operable arrangement, the upper-stream end, 64a, of the return conduit 64 at the branching portion 61 is located above the upper-stream end, 52a, of the second supply conduit 52 at the branching portion 61. This configuration ensures that even if air enters the first supply conduit 51, the contaminate air moves to the return conduit 64, which is located above the second supply conduit 52, at the branching portion 61. Thus, the contaminate air is prevented from reaching the mixing valve 2 through the second supply conduit 52.

More specifically, air may possibly enter the first supply conduit 51 if the mixing valve 2 is kept in in-operating state for maintenance or replacement of the components (such as the lubricant tank 4) connected to the first supply conduit 51, which is located on the upper-stream side of the mixing valve, or if the lubricant supply pump 71 is kept in un-driven state for a long period of time. However, the air that has entered the first supply conduit 51 (contaminate air) moves to the return conduit 64, which is located above the second supply conduit 52, at the branching portion 61. Thus, the contaminate air is prevented from reaching the mixing valve 2 through the second supply conduit 52.

Also in the first embodiment, a lower-stream end portion 64b of the return conduit 64 is connected to the lubricant tank 4. This configuration causes the air that has entered the first supply conduit 51 to be sent to the lubricant tank 4 through the return conduit 64. In this manner, the air is removed out of the first supply conduit 51 (and the circulation conduit CF).

The removal of the air is implemented by, for example, driving the lubricant supply pump 71 with the return conduit 64 in open state (for example, with the closed state of the return conduit 64 released by the switch valve 67). When the return conduit 64 is in open state, the internal pressure of the second supply conduit 52 does not exceed the operating pressure of the mixing valve 2 (more specifically, the operating pressure of the metering valve 23), even if the lubricant supply pump 71 is driven. That is, even if the lubricant supply pump 71 is driven, the mixing valve 2 prevents the movement of the lubricant A, ensuring that the air-contaminated lubricant A does not move through the second supply conduit 52. In other words, in the first embodiment, the mixing valve 2 serves as a closed-state valve during the operation of removing the contaminate air that has entered the first supply conduit 51. This configuration reliably prevents the air-contaminated lubricant A from moving from the branching portion 61 toward the second supply conduit 52 during the operation of removing the contaminate air.

In the example illustrated in FIG. 1, in performing the operation of removing contaminate air, the worker may release the closed state of the return conduit 64, and then drive the lubricant supply pump 71. Also in the example illustrated in FIG. 1, in the operation of removing the contaminate air, the lubricant A returns to the lubricant tank 4, instead of being discharged out of the air bleeder 1. This configuration eliminates a waste of the lubricant A and prevents the environment of the air bleeder 1 and the mixing valve 2 from being contaminated by the lubricant A.

Also in the example illustrated in FIG. 1, the upper-stream end 64a of the return conduit 64 is connected to an upper portion of the branching portion 61, and an upper-stream end portion 641 of the return conduit 64 extends upward from the branching portion 61. With this configuration, in the example illustrated in FIG. 1, the upper-stream end portion 641 of the return conduit 64 serves as a buffer space to receive air. For example, assume that air remains in the first supply conduit 51 due to an insufficient operation of removing contaminate air. In this case, if the return conduit 64 is closed and the lubricant supply pump 71 is driven, the lubricant A flows through the first supply conduit 51 and the second supply conduit 52. However, (part or all of) the air that has entered the branching portion 61 moves upward through the branching portion 61 and is held at the upper-stream end portion 641 (buffer space) of the return conduit 64. This configuration prevents the contaminate air from moving toward the mixing valve 2, even if the operation of removing the contaminate air is insufficient.

Assume that the air bleeder 1 according to the first embodiment is not employed and that work of removing air that has entered the lubricant supply conduit is performed by operating the mixing valve. The amount of lubricant sent from the mixing valve toward a lubrication target portion per unit time is small. Therefore, when the work of removing contaminate air out of the lubricant supply conduit is performed while the mixing valve is kept operating, the work takes a long period of time. Also, in order to remove air through the lubricant conduit located in the mixing valve, it is necessary to adjust the mixing valve into different postures and perform air bleeding work at each posture. Additionally, in order to reliably remove air that has entered the lubricant conduit of the mixing valve, it is necessary to perform, at least 10 times, the work of adjusting the mixing valve into different postures and supplying oil to the lubricant conduit at each posture.

Additionally, in order to remove air completely out of the mixing valve itself, it is necessary to confirm that no air bubbles are coming out of a plug of the mixing valve. Thus, the air bleeding work requires some level of proficiency. Further, there needs to be a worker dedicated to adjusting the posture of the mixing valve and another worker dedicated to activating and stopping the pump. Additionally, the lubricant in the lubricant supply conduit is discharged out of the mixing valve, which is a waste of the lubricant. Further, it is possible for the discharged lubricant to contaminate the environment of the mixing valve.

Additionally, machine tools are huge structures fixed in factories, and bodies of machine tools cannot be easily moved to change positions for daily inspection or periodic maintenance. In view of the circumstances, the worker needs to remove a maintenance cover or a similar object on a fixed machine tool, approach a maintenance target portion, and work on the maintenance target portion. In particular, a mixing valve that supplies lubricant to a lubrication target portion of a machine tool is located inside the machine tool or above the machine tool. Therefore, the work of removing air out of the lubricant supply conduit by operating the mixing valve involves work inside the machine tool or above the machine tool. Thus, the air bleeding work using the mixing valve is quite a burden on the worker from a work environment standpoint.

Contrarily, in the first embodiment, before the air that has entered the lubricant supply conduit reaches the mixing valve through the lubricant supply conduit, the contaminate air is removed. This configuration prevents air from entering the mixing valve, eliminating the need for the work of removing air out of the mixing valve or reducing the frequency of the work. Thus, using the air bleeder according to the first embodiment advantageously takes the burden off the worker who maintains and manages a machine tool.

In the first embodiment, the air bleeder 1 may include a foreign matter removal filter 74, which is located along the first supply conduit 51. When the air bleeder 1 includes the foreign matter removal filter 74, foreign matter is prevented from entering the mixing valve 2. As a result, foreign matter is prevented from entering the fluid mixture ejected from the mixing valve 2. This configuration prevents foreign matter otherwise contained in the fluid mixture from damaging the supply target of the lubricant A (that is, lubrication target portion).

Also, by cleaning or replacing the foreign matter removal filter 74 or a part of the foreign matter removal filter 74 (for example, filter element), the foreign matter removal filter 74's function of preventing foreign matter contamination can be maintained. In this respect, if the foreign matter removal filter 74 or a part of the foreign matter removal filter 74 is replaced, air may possibly enter the first supply conduit 51. In the first embodiment, however, the branching portion 61 is located on the lower-stream side of the foreign matter removal filter 74, and, at the branching portion 61, the upper-stream end 64a of the return conduit 64 is located above the upper-stream end 52a of the second supply conduit 52. With this configuration, if the operation of removing the contaminate air is performed (that is, if the lubricant supply pump 71 is driven with the return conduit 64 in open state) after the foreign matter removal filter 74 has been replaced, the contaminate air is removed out of the first supply conduit 51.

In the example illustrated in FIG. 1, a first foreign matter removal filter 74a (more specifically, line filter) is located along the first supply conduit 51 (more specifically, at an intermediate portion of the first supply conduit 51). The first foreign matter removal filter 74a prevents foreign matter that has entered the first supply conduit 51 from reaching the mixing valve 2 through the second supply conduit 52. The first foreign matter removal filter 74a is positioned on the lower-stream side of the lubricant supply pump 71. This configuration enables the first foreign matter removal filter 74a to remove not only the foreign matter contained in the lubricant A but also foreign matter generated as a result of operation of the lubricant supply pump 71 (an example of such foreign matter is a removed part of the outer layer of the lubricant supply pump 71, a removed part of the outer layer of the first supply conduit 51, or a removed part of the outer layer of a second foreign matter removal filter 74b, described later).

In the example illustrated in FIG. 1, the first foreign matter removal filter 74a is located outside the lubricant tank 4. With this configuration, the work of replacing the first foreign matter removal filter 74a or a part of the first foreign matter removal filter 74a is comparatively easy.

In the example illustrated in FIG. 1, the second foreign matter removal filter 74b (more specifically, suction filter) is located at the base end of the first supply conduit 51. The second foreign matter removal filter 74b prevents foreign matter contained in the lubricant tank 4 from entering the first supply conduit 51. The second foreign matter removal filter 74b is located in the lubricant tank 4. With this configuration, the second foreign matter removal filter 74b is difficult to replace as compared with the first foreign matter removal filter 74a. Because of this difficulty, the second foreign matter removal filter 74b may, in some cases, be left un-replaced for a long period of time. In this case, a part of the outer layer of the second foreign matter removal filter 74b may be removed, resulting in foreign matter. In order to minimize the possibility of generation of foreign matter resulting from partial removal of the outer layer of the second foreign matter removal filter 74b, the second foreign matter removal filter 74b is preferably such a filter that partial removal of the outer layer is difficult to occur (an example of such filter is a wire-mesh type filter). The second foreign matter removal filter 74b may be rougher than the first foreign matter removal filter 74a. In this case, the second foreign matter removal filter 74b removes comparatively large-size foreign matter. This prevents clogging of the first foreign matter removal filter 74a and reduces the frequency of replacement of the first foreign matter removal filter 74a.

It is noted that in the first embodiment, either the first foreign matter removal filter 74a or the second foreign matter removal filter 74b may be omitted.

A configuration of the air bleeder 1 according to the first embodiment will be described in more detail.

Lubricant Tank 4

In the example illustrated in FIG. 1, the lubricant tank 4 includes a lubricant inlet orifice 41 and a lid member 42, which closes the lubricant inlet orifice 41. The lubricant inlet orifice 41 may be provided with an inlet orifice filter 43 (for example, a filter that removes impurities having particle diameters of 400 µm or greater), which prevents foreign matter from entering the lubricant tank 4 through the lubricant inlet orifice 41.

In the example illustrated in FIG. 1, the second foreign matter removal filter 74b is integral to the lubricant supply pump 71. This configuration enables the second foreign matter removal filter 74b and the lubricant supply pump 71 to be handled as a single unit that can be more easily removed from the lubricant tank 4 for maintenance purposes.

First Supply Conduit 51

The upper-stream end of the first supply conduit 51 is connected to the lubricant tank 4, and the lower-stream end of the first supply conduit 51 is connected to the branching portion 61. The first supply conduit 51 may be made of a resin material or a metal material. Also, the first supply conduit 51 may be a flexible conduit or a rigid conduit, or may have a rigid part forming an inner conduit. Alternatively, the first supply conduit 51 may be a combination of the foregoing.

In the example illustrated in FIG. 1, a lower-stream end portion 511 of the first supply conduit 51 is an upward conduit forming an upward flow toward the branching portion 61. Since the lower-stream end portion 511 is an upward conduit, contaminate air is prone to move upward at the branching portion 61. This makes removal of contaminate air more reliable through the return conduit 64. It is noted that the upward conduit may be a vertically upward conduit or an inclined upward conduit.

Return Conduit 64

The upper-stream end 64a of the return conduit 64 is connected to the branching portion 61, and the lower-stream end portion 64b of the return conduit 64 is connected to the lubricant tank 4. The return conduit 64 may be made of a resin material or a metal material. Also, the return conduit 64 may be a flexible conduit or a rigid conduit, or may have a rigid part forming an inner conduit. Alternatively, the return conduit 64 may be a combination of the foregoing.

In the example illustrated in FIG. 1, the upper-stream end portion 641 of the return conduit 64 is an upward conduit forming an upward flow from the branching portion 61. Since the upper-stream end portion 641 is an upward conduit, contaminate air that has entered the upper-stream end portion 641 through the branching portion 61 is prevented from returning to the branching portion 61. It is noted that the upward conduit may be a vertically upward conduit or an inclined upward conduit.

From the viewpoint of smoothness in guiding the contaminate air contained in the lower-stream end portion 511 of the first supply conduit 51 to the upper-stream end portion 641 of the return conduit 64, the angle between the lower-stream end portion 511 and the upper-stream end portion 641 is preferably an obtuse angle, more preferably 120 degrees or greater, further more preferably 150 degrees or greater, and still further more preferably 180 degrees or greater.

Switch Valve 67

The switch valve 67, which opens and closes the return conduit, may be a manual valve, an electric valve, or an electromagnetic valve. When the switch valve 67 is a manual valve, the switch valve 67 includes a handle 671. When the switch valve 67 is an electric valve or an electromagnetic valve, the switch valve 67 includes a driver 672. The driver 672 is connected to a controller (not illustrated in FIG. 1) in a signal-transmittable manner. Second Supply Conduit 52

The upper-stream end 52a of the second supply conduit 52 is connected to the branching portion 61, and the lower-stream end of the second supply conduit 52 is connected to the mixing valve 2. The second supply conduit 52 may be made of a resin material or a metal material. Also, the second supply conduit 52 may be a flexible conduit or a rigid conduit, or may have a rigid part forming an inner conduit. Alternatively, the second supply conduit 52 may be a combination of the foregoing. It is noted, however, that from the viewpoint of greater degree of freedom of arrangement of the lubricant tank 4 and other components, the second supply conduit 52 is preferably a flexible conduit.

Branching Portion 61

The branching portion 61 may be a manifold-type branching portion. This manifold-type branching portion includes a lubricant reservoir. To the lubricant reservoir, the first supply conduit 51, the second supply conduit 52, and the return conduit 64 are connected.

Alternatively, the branching portion 61 may be a piping joint. In this case, the first supply conduit 51, the second supply conduit 52, and the return conduit 64 are connected to each other via the piping joint, and the piping joint serves as the branching portion 61.

The lubricant tank 4, the lubricant supply pump 71, the foreign matter removal filter 74, the branching portion 61, the first supply conduit 51, the return conduit 64, and the switch valve 67 may form a single transportable unit.

Second Embodiment

Figure 3:
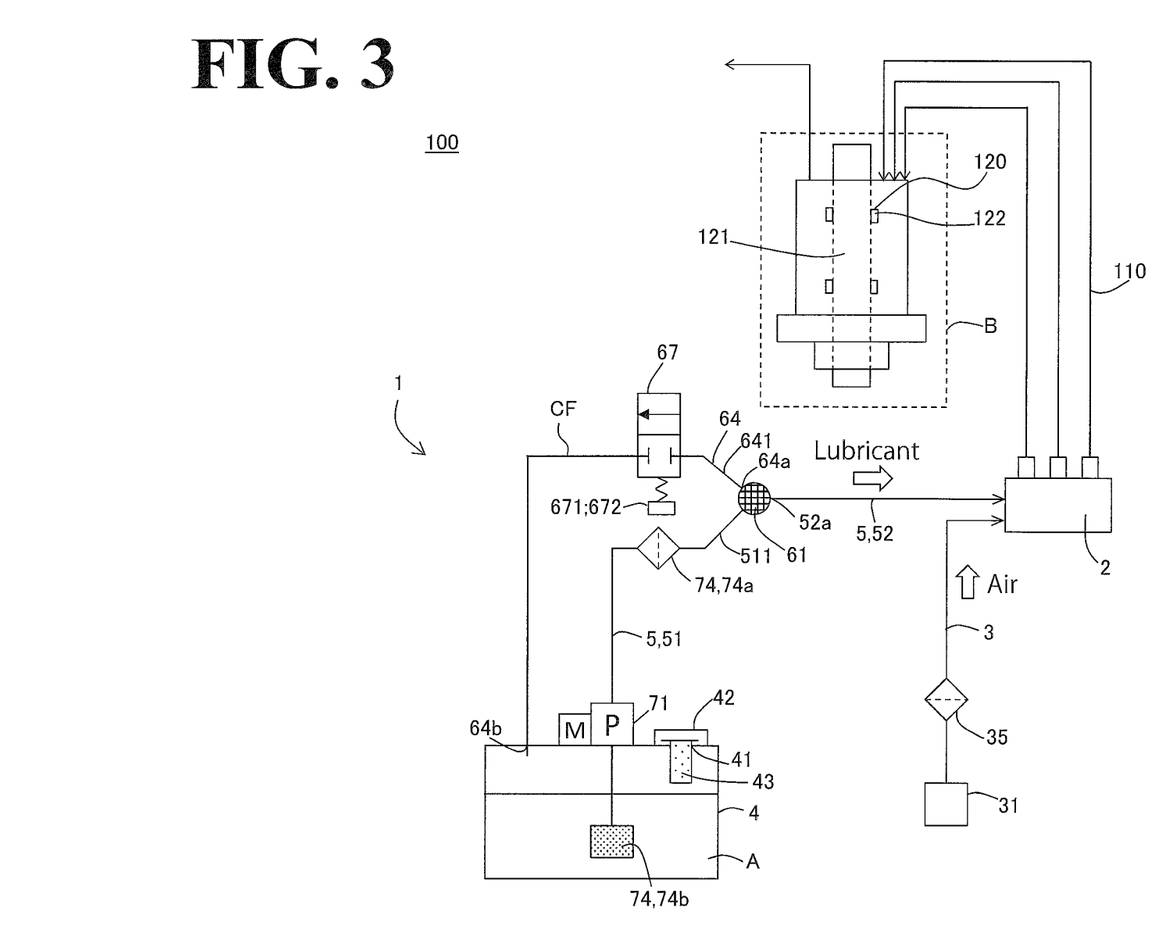
FIG. 3 schematically illustrates a lubricator according to a second embodiment.

By referring to FIG. 3, a second embodiment will be described. The second embodiment is an embodiment related to a lubricator 100. FIG. 3 schematically illustrates the lubricator 100 according to the second embodiment.

The lubricator 100 according to the second embodiment includes: the air bleeder 1 according to the first embodiment; a mixing valve 2; an air supply conduit 3; and fluid mixture supply conduits 110, which supplies a fluid mixture of lubricant A and air to lubrication target portions 120. The air bleeder 1 according to the second embodiment is similar to the air bleeder 1 according to the first embodiment. In light of this, redundant description of configurations of the air bleeders 1 will be omitted.

The fluid mixture supply conduits 110 is located between the mixing valve 2 and the lubrication target portions 120, which are located in a machine tool B. In the example illustrated in FIG. 3, there are three fluid mixture supply conduits 110 connecting the mixing valve 2 and the lubrication target portions 120 to each other. The number of the fluid mixture supply conduits 110, however, may be one, two, or four or more. It is noted that examples of the machine tool B include a machining center, a lathe, and a combined machine. Also in the example illustrated in FIG. 3, the lubrication target portions 120 are bearings 122 of a spindle 121 of the machine tool B. The lubrication target portions 120, however, may be at other than the spindle 121 insofar as the lubrication target portions 120 are where a fluid mixture of the lubricant A and air is supplied.

In the second embodiment, air may possibly enter the first supply conduit 51 during maintenance or replacement of the components located on the upper-stream side of the branching portion 61 (such as the lubricant tank 4, the foreign matter removal filter 74, and the lubricant supply pump 71). However, since the lubricator 100 according to the second embodiment includes the air bleeder 1 according to the first embodiment, contaminate air is easily removed out of the first supply conduit 51. Also, when the lubricator 100 according to the second embodiment includes the foreign matter removal filter 74 on the first supply conduit 51, foreign matter that has entered the first supply conduit 51 is removed. Thus, the second embodiment provides advantageous effects similar to the advantageous effects of the first embodiment.

Also, if air enters the lubricant conduit of the mixing valve 2, the mixing valve 2's function of supplying a predetermined amount of the lubricant A is undermined. In the example illustrated in FIG. 3, the mixing valve 2 and the lubrication target portions 120 of the machine tool B are connected to each other via the fluid mixture supply conduits 110. With this configuration, if the function of supplying a predetermined amount of the lubricant A is undermined, the amount of the lubricant A sent to the bearings 122 is instabilized. This results in an insufficient reduction in the frictional resistance of the bearings 122, causing, in some cases, a seizure on the bearings 122. As a result, the spindle 121 may fail. If the spindle 121 of the machine tool fails, large-scale repair work is necessitated.

Contrarily, in the second embodiment, even if air enters the first supply conduit 51 during maintenance or replacement of the components located on the upper-stream side of the branching portion 61 (such as the lubricant tank 4, the foreign matter removal filter 74, and the lubricant supply pump 71), the contaminate air is easily removed out of the lubricant supply conduit 5 (more specifically, the first supply conduit 51). Therefore, in the second embodiment, the function of supplying a predetermined amount of the lubricant A is not undermined, and the reduction in the frictional resistance of the bearings 122 is not insufficient. Also, the risk of a failed spindle 121 is reduced. Also, in the second embodiment, the air bleeding work of removing contaminate air out of the first supply conduit 51 can be easily performed.

Therefore, the air bleeding work is expected to be performed more frequently after maintenance work (for example, the work of replacing the foreign matter removal filter 74 or a part of the foreign matter removal filter 74) and maintenance work of the foreign matter removal filter 74. As a result, the oil flowing in the lubricant supply conduit 5 is maintained in optimal state, and thus the lubrication target portions 120 and the machine tool B are maintained in optimal state.

Generally, the length of each of the fluid mixture supply conduits 110, which connect the mixing valve 2 and the lubrication target portions 120 to each other, needs to be set at a moderate length. If the length of each fluid mixture supply conduit 110 is too small, the lubricant A may be insufficiently dispersed in the air in the fluid mixture supply conduit 110. If the length of each fluid mixture supply conduit 110 is too large, there occurs a large time lag between the start of operation of the mixing valve 2 and the timing at which the fluid mixture is ejected to the lubrication target portions 120.

In view of the circumstances, the mixing valve 2 is, in many cases, located above the machine tool B or inside the machine tool B. Conventionally, in removing air that has entered the lubricant supply conduit, it was necessary to change the mixing valve into different postures and perform air bleeding work at each posture. This caused a greatly burdensome work environment for the worker who performed the air bleeding work. Contrarily, in the second embodiment, the work of removing air that has entered the lubricant supply conduit can be performed around the machine tool B. This makes the work environment of the worker who performs the air bleeding work a better work environment.

It is noted that the length of the second supply conduit 52, which connects the branching portion 61 and the mixing valve 2 to each other, is preferably greater than the length of the first supply conduit 51, which connects the lubricant tank 4 and the branching portion 61 to each other. This is from the viewpoint of securing a sufficiently long distance between the mixing valve 2, which is located, for example, above the machine tool B or inside the machine tool B, and the foreign matter removal filter 74 and other components located around the machine tool B, and the viewpoint of arranging the branching portion 61, the foreign matter removal filter 74, the switch valve 67, and the lubricant tank 4 in a compact manner.

When the machine tool is a large-size machine, the length of the lubricant supply conduit 5 (more specifically, the length of the second supply conduit 52) is preferably greater than the length of each fluid mixture supply conduit 110. This is from the viewpoint of securing a sufficiently long distance between the mixing valve 2, which is located, for example, above the machine tool B or inside the machine tool B, and the foreign matter removal filter 74 and other components located around the machine tool B.

It is noted that the lubricant tank 4, the foreign matter removal filter 74, and the switch valve 67 (and the handle 671 of the switch valve 67) are located, for example, at positions around the machine tool B and at a height within reach of the hand of the worker. This is from considerations including approachability for the worker.

Example of Controller 130

Figure 4:
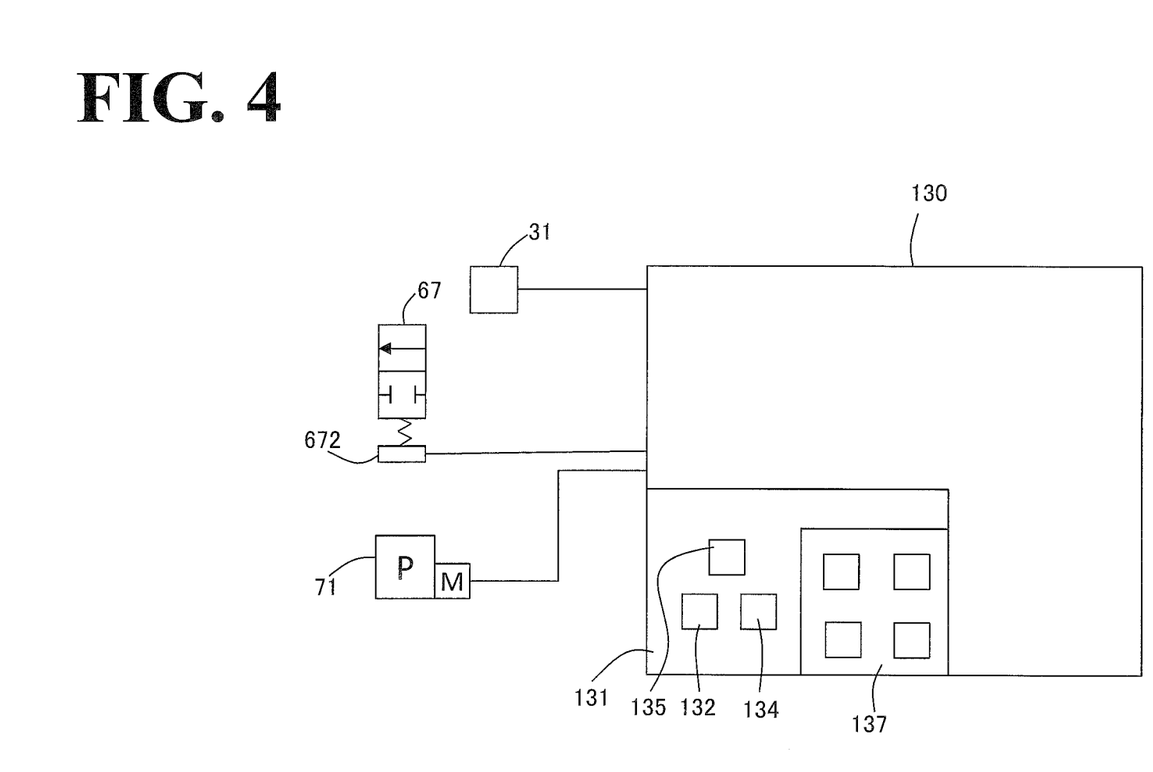
FIG. 4 schematically illustrates a part of the lubricator including a controller, a lubricant supply pump, and a switch valve.

Next, by referring to FIG. 4, description will be made with regard to an example of a controller 130, which controls the lubricator 100 according to the second embodiment. FIG. 4 schematically illustrates a part of the lubricator 100 including the controller 130, the lubricant supply pump 71, the switch valve 67, and the air supply source 31.

The controller 130 controls operation of the lubricant supply pump 71, operation of the switch valve 67, and operation of the air supply source 31.

The controller 130 and the lubricant supply pump 71 (more specifically, the motor M) are connected to each other in a control-signal transmittable manner. This connection may be a wired connection or a wireless connection. The controller 130 and the switch valve 67 (more specifically, the driver 672 of the switch valve) are connected to each other in a control-signal transmittable manner. This connection may be a wired connection or a wireless connection. Similarly, the controller 130 and the air supply source 31 are connected to each other in a control-signal transmittable manner. This connection may be a wired connection or a wireless connection. It is noted that the air supply source 31, which is controlled by the controller 130, is an openable and closable valve located on the air supply conduit 3.

The controller 130 includes a drive switch 132 for the lubricant supply pump 71 and an operation switch 134 for the switch valve 67. The controller 130 may include an operation switch 135 for the air supply source 31. The drive switch 132 for the lubricant supply pump 71, the operation switch 134 for the switch valve 67, and the operation switch 135 for the air supply source 31 are located on an operation panel 131 of the controller 130.

In the example illustrated in FIG. 4, the air bleeding work of bleeding air out of the first supply conduit 51 can be performed by merely operating the drive switch 132 and the operation switch 134, which are located in the controller 130 (more specifically, on the operation panel 131). This configuration reduces the work burden on the worker.

It is noted that the operation panel 131 may include an operation switch 137 for the machine tool. In other words, the operation switch 137 for the machine tool, the drive switch 132, the operation switch 134, and the operation switch 135 are located adjacent to each other. In this case, the worker is able to, without moving, check that the machine tool B has stopped driving and perform the air bleeding work of bleeding air out of the first supply conduit 51.

Alternatively, the operation panel 131 may be an operation panel dedicated to the lubricator 100. Also alternatively, the drive switch 132 may be directly mounted on the lubricant supply pump 71, the operation switch 134 may be directly mounted on the switch valve 67, and the operation switch 135 may be directly mounted on the air supply source 31.

Third Embodiment

Figure 5:
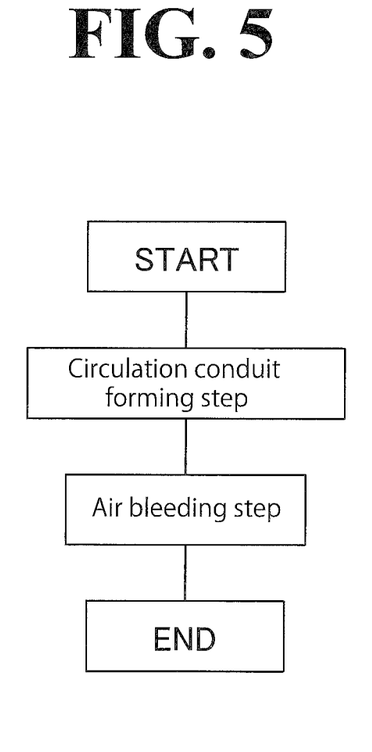
FIG. 5 is a flowchart of an exemplary method according to a third embodiment for bleeding air.
Figure 6:
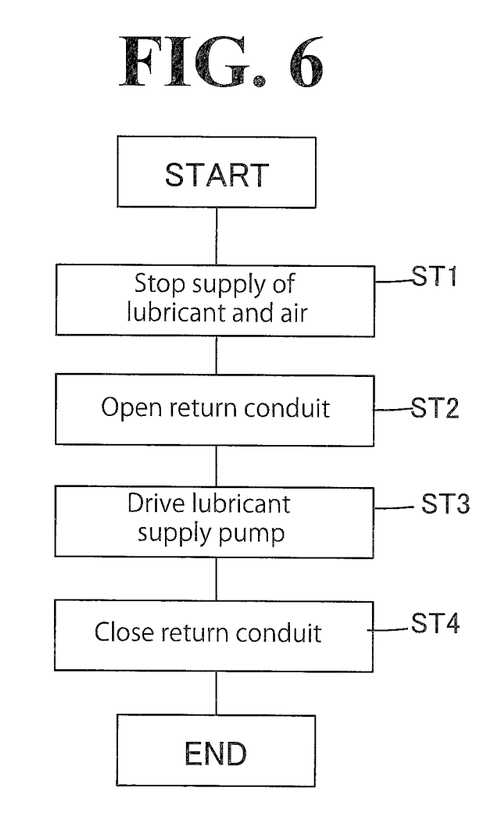
FIG. 6 is a flowchart of an exemplary method according to the third embodiment for bleeding air.

Next, by referring to FIGS. 1 to 6, a third embodiment will be described. The third embodiment is an embodiment associated with a method for bleeding air. FIG. 5 is a flowchart of an exemplary method according to the third embodiment for bleeding air. FIG. 6 is a flowchart of an exemplary method according to the third embodiment for bleeding air.

The method according to the third embodiment for bleeding air is a method for bleeding air using the air bleeder 1 according to the first embodiment or the lubricator 100 according to the second embodiment.

By referring to FIGS. 1 and 5, a summary of the method according to the third embodiment for bleeding air will be described. The method for bleeding air includes a circulation conduit forming step and an air bleeding step.

In the circulation conduit forming step, the switch valve 67 and related components open the return conduit 64. Upon opening of the return conduit 64, the lubricant tank 4, the first supply conduit 51, the branching portion 61, and the return conduit 64 form the circulation conduit CF.

In the air bleeding step, the lubricant A is caused to circulate through the circulation conduit CF. By the circulating lubricant A, the lubricant A containing contaminate air is caused to return to the lubricant tank 4. In this manner, the contaminate air is removed out of the first supply conduit 51.

It is noted that the air bleeding step is performed with the flow of the lubricant A through the second supply conduit 52 being stopped by the mixing valve 2. More specifically, when the return conduit 64 is in open state, the internal pressure of the second supply conduit 52 does not exceed the operating pressure of the mixing valve 2 (more specifically, the operating pressure of the metering valve 23). This ensures that the mixing valve 2 does not accept the lubricant A from the second supply conduit 52.

In the third embodiment, since the air bleeding step is performed with the flow of the lubricant A through the second supply conduit 52 being stopped, contaminate air does not flow toward the second supply conduit 52 in the air bleeding step.

Also in the third embodiment, air is removed out of the first supply conduit 51 merely by operating the switch valve 67 and related components to turn the return conduit 64 into open state and then causing the lubricant A to circulate through the circulation conduit CF. This configuration reduces the work burden on the worker who performs the air bleeding work. The above configuration also shortens the work time.

By referring to FIGS. 3, 4, and 6, the method according to the third embodiment for bleeding air will be described in more detail.

At first step ST1, supply of the lubricant A and air to the mixing valve 2 is stopped. The supply of the lubricant A is stopped by, for example, stopping the operation of the lubricant supply pump 71 and stopping the operation of the air supply source 31. The operation of the lubricant supply pump 71 may be stopped by operating the drive switch 132 on the operation panel 131. The supply of air may be stopped by operating the operation switch 135 on the operation panel 131.

At second step ST2, the switch valve 67 opens the return conduit 64. The second step ST2 corresponds to the above-described circulation conduit forming step. The second step ST2 may be performed by operating the operation switch 134 on the operation panel 131. When the switch valve 67 is an openable and closable valve, the switch valve 67's operation of opening the return conduit 64 corresponds to the switch valve 67's turning into open state. When the switch valve 67 is a multi-directional valve (for example, three-way valve), the switch valve 67's operation of opening the return conduit 64 corresponds to such an operation that the switch valve 67, which is a multi-directional valve, turns the first supply conduit 51 and the return conduit 64 into mutually connected state.

At third step ST3, the lubricant supply pump 71 is driven. Upon driving of the lubricant supply pump 71, the lubricant A is caused to circulate through the circulation conduit CF. That is, the third step ST3 corresponds to the above-described air bleeding step. The third step ST3 may be performed by operating the drive switch 132 on the operation panel 131. After the air bleeding step ends, the driving of the lubricant supply pump 71 is stopped.

At fourth step ST4, the switch valve 67 closes the return conduit 64. The fourth step ST4 may be performed by operating the operation switch 134 on the operation panel 131. When the switch valve 67 is an openable and closable valve, the switch valve 67's operation of closing the return conduit 64 corresponds to the switch valve 67's turning into closed state. When the switch valve 67 is a multi-directional valve (for example, three-way valve), the switch valve 67's operation of closing the return conduit 64 corresponds to such an operation that the switch valve 67, which is a multi-directional valve, turns the first supply conduit 51 and the second supply conduit 52 into mutually connected state.

After the fourth step ST4, the lubricator 100 is able to perform the operation of supplying lubricant to the lubrication target portions 120. Specifically, after the fourth step ST4, the supply of the lubricant A and air to the mixing valve 2 is caused to start, causing a fluid mixture containing the lubricant A to be supplied from the mixing valve 2 to the lubrication target portions 120. The supply of the lubricant A to the lubrication target portions 120 is performed by, for example, starting the operation of the lubricant supply pump 71 and starting the operation of the air supply source 31. The operation of the lubricant supply pump 71 may be caused to start by operating the drive switch 132. The supply of air may be caused to start by operating the operation switch 135.

Thus, in the third embodiment, the air bleeding work is performed simply by operating the switch valve 67 and/or the lubricant supply pump 71. This configuration reduces the work burden on the worker who performs the air bleeding work. The above configuration also shortens the work time. Also, when the operation switch 134, with which the switch valve 67 is driven, and the drive switch 132, with which the lubricant supply pump 71 is driven, are located adjacent to each other (for example, when the operation switch 134 and the drive switch 132 are located on the operation panel 131), the worker is able to perform the air bleeding work without moving.

Obviously, numerous modifications and variations of the present invention are possible in light of the above teachings. It is therefore to be understood that within the scope of the appended claims, the present disclosure may be practiced otherwise than as specifically described herein.

What is claimed is:

1. An air bleeder configured to remove air out of a lubricant supply conduit, the air bleeder comprising:
   the lubricant supply conduit through which a lubricant is supplied to a mixing valve located in a machine tool;
   a lubricant tank in which the lubricant is stored;
   a branching portion located along the lubricant supply conduit; and
   a return conduit connecting the branching portion and the lubricant tank to each other,
   wherein the lubricant supply conduit comprises:
      a first supply conduit connecting the lubricant tank and the branching portion to each other; and
      a second supply conduit connecting the branching portion and the mixing valve to each other,
   wherein the mixing valve is configured to open to allow the lubricant to pass through the mixing valve when a pressure of the lubricant in the second supply conduit exceeds a threshold pressure and to close to disallow the lubricant to pass through the mixing valve when the pressure of the lubricant in the second supply conduit does not exceed the threshold pressure,
   wherein the air bleeder further comprises a switch valve to open the return conduit such that a pressure of the lubricant in the second supply conduit is smaller than or equal to the threshold pressure and to close the return conduit, and wherein at the branching portion, an upper-stream end of the return conduit is located above an upper-stream end of the second supply conduit.

2. The air bleeder according to claim 1, wherein a lower-stream end portion of the first supply conduit comprises an upward conduit forming an upward flow toward the branching portion.

3. The air bleeder according to claim 2, further comprising a foreign matter removal filter located along the first supply conduit.

4. The air bleeder according to claim 1, further comprising a foreign matter removal filter located along the first supply conduit.

5. A lubricator comprising:
the air bleeder according to claim 1;
the mixing valve configured to mix the lubricant and air together;
an air supply conduit through which the air is supplied to the mixing valve; and
a fluid mixture supply conduit which is located between the mixing valve and a lubrication target portion of the machine tool and through which a fluid mixture of the lubricant and the air is supplied to the lubrication target portion.

6. The lubricator according to claim 5, wherein the second supply conduit has a length greater than a length of the first supply conduit.

7. The lubricator according to claim 5, further comprising:
a lubricant supply pump configured to supply the lubricant from the lubricant tank to the first supply conduit; and
a controller configured to control an operation of at least the lubricant supply pump, the controller comprising a drive switch that is for the lubricant supply pump and that is located on an operation panel of the controller.

8. A method for bleeding air using an air bleeder configured to remove air out of a lubricant supply conduit, the air bleeder comprising:
the lubricant supply conduit through which a lubricant is supplied to a mixing valve located in a machine tool;
a lubricant tank in which the lubricant is stored;
a branching portion located along the lubricant supply conduit; and
a return conduit connecting the branching portion and the lubricant tank to each other,
wherein the lubricant supply conduit comprises:
a first supply conduit connecting the lubricant tank and the branching portion to each other; and
a second supply conduit connecting the branching portion and the mixing valve to each other,
wherein the mixing valve is configured to open to allow the lubricant to pass through the mixing valve when a pressure of the lubricant in the second supply conduit exceeds a threshold pressure and to close to disallow the lubricant to pass through the mixing valve when the pressure of the lubricant in the second supply conduit does not exceed the threshold pressure,
wherein the air bleeder further comprises a switch valve to open the return conduit such that a pressure of the lubricant in the second supply conduit is smaller than or equal to the threshold pressure and to close the return conduit, and
wherein at the branching portion, an upper-stream end of the return conduit is located above an upper-stream end of the second supply conduit,
the method comprising:
opening the mixing valve when the pressure of the lubricant in the second supply conduct exceeds the threshold pressure to allow the lubricant stored in the tank to pass through the mixing valve via the first supply conduit and the second supply conduit
opening the return conduit to form a circulation conduit comprising the lubricant tank, the first supply conduit, the branching portion, and the return conduit; and
causing the lubricant to circulate through the circulation conduit such that the pressure of the lubricant in the second supply conduct is less than or equal to the threshold pressure to close the mixing valve.

9. An air bleeder comprising:
a branch;
a lubricant supply conduit via which lubricant stored in a tank is to be supplied to a valve provided in a machine tool, the lubricant supply conduit comprising:
a first supply conduit connecting the branch and the tank; and
a second supply conduit connecting the branch at a first connecting position and the valve; and
a return conduit connecting the tank and the branch at a second connecting position higher than the first connecting position in a height direction along a height of the air bleeder to return lubricant to the tank and to remove air from lubricant in the lubricant supply conduit,
the valve being configured to open to allow the lubricant to pass through the valve when a pressure of the lubricant in the second supply conduit exceeds a threshold pressure and to close to disallow the lubricant to pass through the valve when the pressure of the lubricant in the second supply conduit does not exceed the threshold pressure; and
a switch valve to open the return conduit such that a pressure of the lubricant in the second supply conduit is smaller than or equal to the threshold pressure and to close the return conduit.

10. The air bleeder according to claim 9, wherein the valve is a mixing valve to mix lubricant and air.

11. A lubricator comprising:
the air bleeder according to claim 10;
the mixing valve;
an air supply conduit through which the air is to be supplied to the mixing valve; and
a fluid mixture supply conduit which is located between the mixing valve and a lubrication target portion of the machine tool and through which a fluid mixture of the lubricant and the air is to be supplied to the lubrication target portion.

12. The lubricator according to claim 11, wherein the second supply conduit has a length greater than a length of the first supply conduit.

13. The lubricator according to claim 11, further comprising:
a lubricant supply pump configured to supply the lubricant from the tank to the first supply conduit; and
a controller comprising:
an operation panel; and
a drive switch provided on the operation panel to control the lubricant supply pump.

14. The air bleeder according to claim 9, wherein a lower-stream end of the first supply conduit has a shape along which the lubricant flows upwardly toward the branch.

15. The air bleeder according to claim 9, further comprising a filter located along the first supply conduit to remove foreign matter in the lubricant.

16. A method for bleeding air, comprising:
- providing a second supply conduit connected to a first connecting position of a branch and led to a valve provided in a machine tool;
- providing a return conduit connected to a second connecting position of the branch which is higher than the first connecting position in a height direction along a height of an air bleeder to guide air in lubricant in the second supply conduit to the return conduit;
- closing the return conduit to increase a pressure of lubricant in the second supply conduit:
- opening the valve when the pressure of the lubricant in the second supply conduit exceeds a threshold pressure to allow the lubricant stored in a tank to pass through the valve via a first supply conduit and the second supply conduit, the first supply conduit being connected to the tank and the branch; and
- opening the return conduit to remove air from the lubricant in the first supply conduit and the second supply conduit via the branch such that the pressure of the lubricant in the second supply conduct is less than or equal to the threshold pressure to close the valve.

* * * * *